LINEARIZED ANALOG-TO-DIGITAL CONVERTERS

Filed Sept. 11, 1964 7 Sheets-Sheet 1

LINEARIZED ANALOG-TO-DIGITAL CONVERTERS

Filed Sept. 11, 1964

7 Sheets-Sheet 3

Nov. 21, 1967 I. G. BARD ETAL 3,354,452

LINEARIZED ANALOG-TO-DIGITAL CONVERTERS

Filed Sept. 11, 1964 7 Sheets-Sheet 4

LINEARIZED ANALOG-TO-DIGITAL CONVERTERS

Filed Sept. 11, 1964 7 Sheets-Sheet 5

LINEARIZED ANALOG-TO-DIGITAL CONVERTERS

Filed Sept. 11, 1964 7 Sheets-Sheet 7

United States Patent Office 3,354,452 Patented Nov. 21, 1967

3,354,452
LINEARIZED ANALOG-TO-DIGITAL CONVERTERS

Irving Gary Bard, Philadelphia, and Richard S. Rogers, Norristown, Pa., assignors to Leeds & Northrup Company, a corporation of Pennsylvania Filed Sept. 11, 1964, Ser. No. 395,669
7 Claims. (Cl. 340—347)

This invention relates to methods and systems for converting analog values of a measured variable, such as temperature, flow, pressure, or the like, to digital values which are compensated in correction for the non-linear characteristic of transducers responsive to the variable.

In accordance with the present invention, the non-linear characteristic curve of the transducer is considered as a series of linear segments of lines each intersecting the characteristic curve at a pair of adjacent "breakpoints" and respectively having different slopes and ordinate intercepts. In sampling of the output of the transducer to ascertain the existing analog value or magnitude of the variable, it is first determined between which pair of adjacent breakpoints that the analog value lies and then there is introduced into the analog-to-digital converter (ADC) system both the change in "offset" and "gain" which, for the segment defined by those breakpoints, afford a substantially linear relationship between the existing magnitude of the variable and the ADC count. In general, and for any particular non-linear characteristic, the accuracy of the ADC count may be made as high as desired by establishing a suitable number of segments each of length insuring the count error does not exceed a tolerable maximum.

More particularly and as embodied in a high-speed analog-to-digital converter, the preliminary breakpoint checking is effected by means including additional stages of the shift-register normally used for the analog-to-digital conversion. In a converter cycle, these additional stages, via a matrix, successively turn ON preselected ones of the electronic switches normally used in the conversion so to establish reference current values respectively corresponding with the breakpoints for comparison with the unknown output of the transducers. Flip-flop circuits respectively set by such additional stages of the shift-register are reset by Decision means of the converter in accordance with the results of such comparison so to identify by the reset pattern between which pair of breakpoints the unknown values lies. Upon completion of the breakpoint checking, an interrogation circuit checks the reset pattern of the flip-flops and turns ON switches which provide the offset and gain required for a linearized count between such pair of breakpoints. Such switches remain ON for the remainder of the converter cycle so that in the conversion phase of the cycle, the count ascertained during digital changes of the reference current under control of electronic switches sucessively turned ON by subsequent stages of the shift-register and left ON or turned OFF under control of the Decision means is a linearized count.

Further in accordance with the invention, the shift-register may include an additional stage or stages for checking, prior to conversion, whether the analog of the unknown has an alarm magnitude. Such additional stages, via a flip-flop and associated switches, momentarily apply a reference current corresponding with a preset alarm value of the unknown. If the Decision means ascertains that the unknown is not of safe magnitude (above High Alarm limit or below Low Alarm limit), the flip-flop for High Alarm remains set and the flip-flop for the Low Alarm is reset which is effective to control an alarm means, and conversely. Both upper and lower limits of safe values of the unknown may be so checked.

For a more detailed understanding of the invention, reference is made in the following description to the attached drawings in which.

Figure 7:
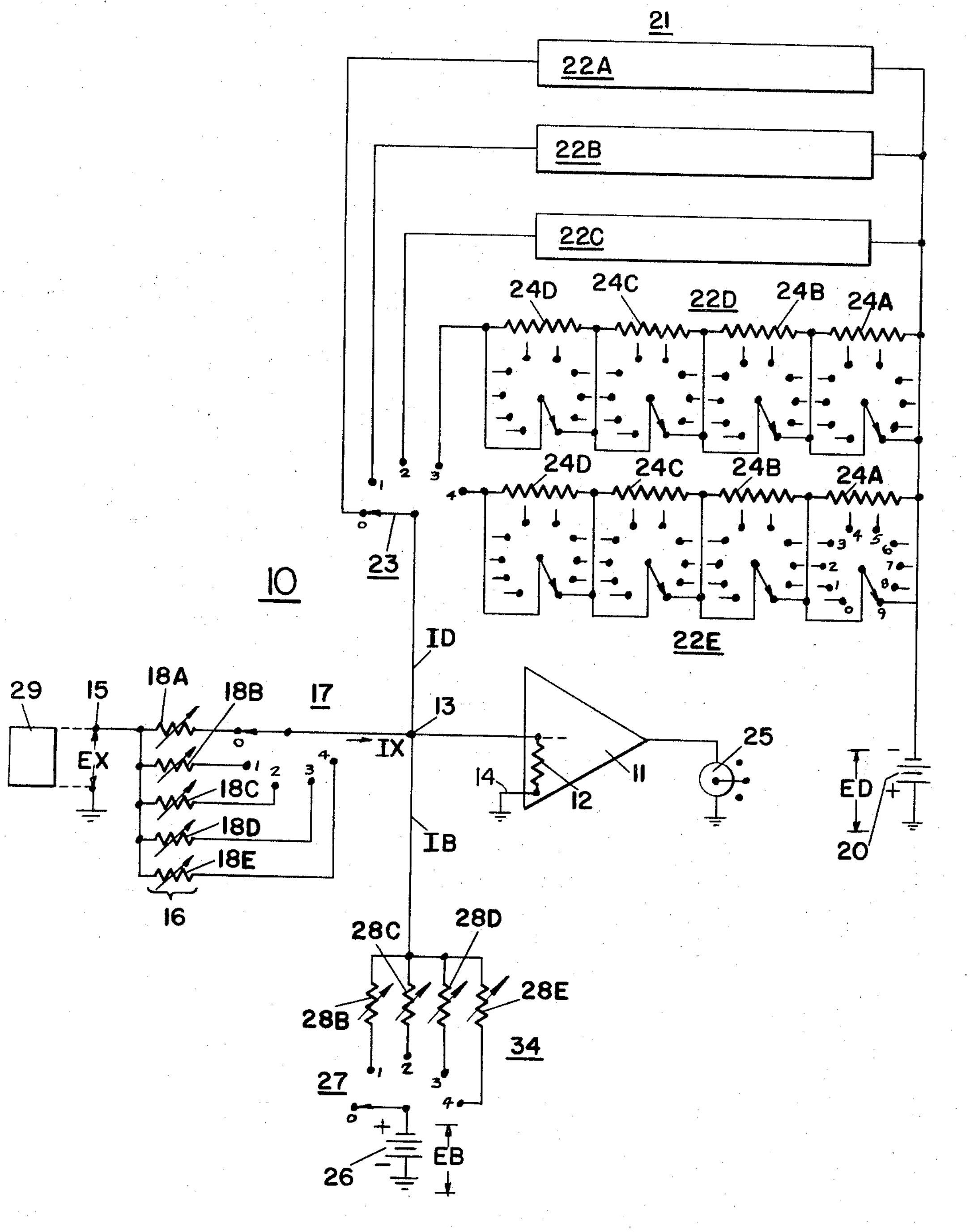
Figure 8A:
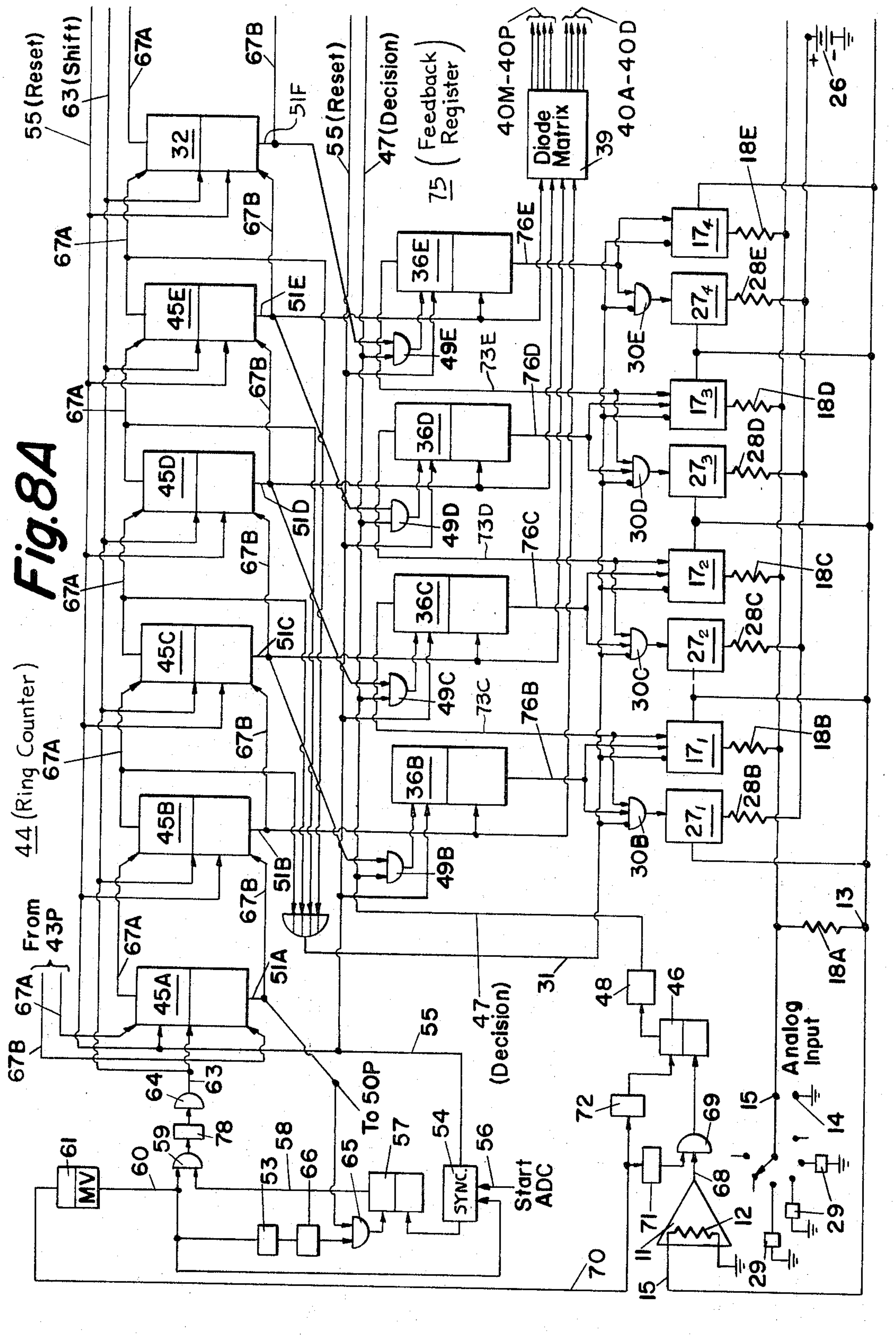
Figure 8B:
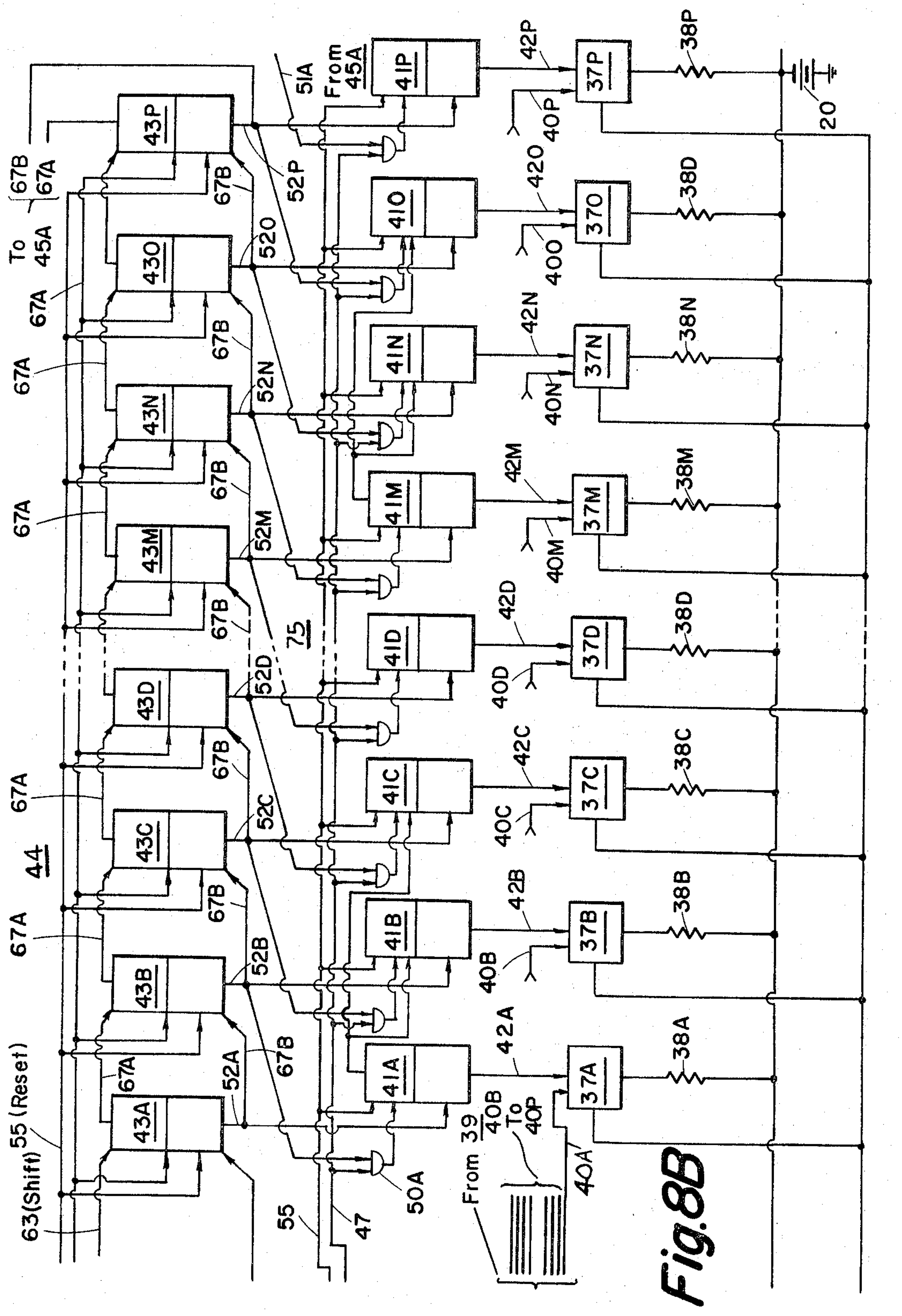
Figures 9, 11:
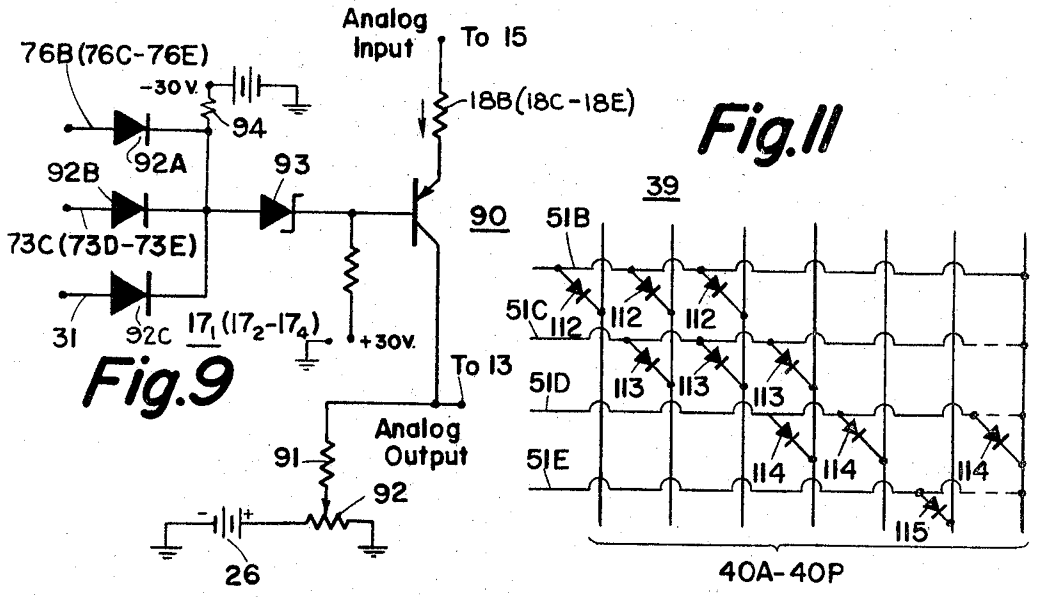
Figure 10:
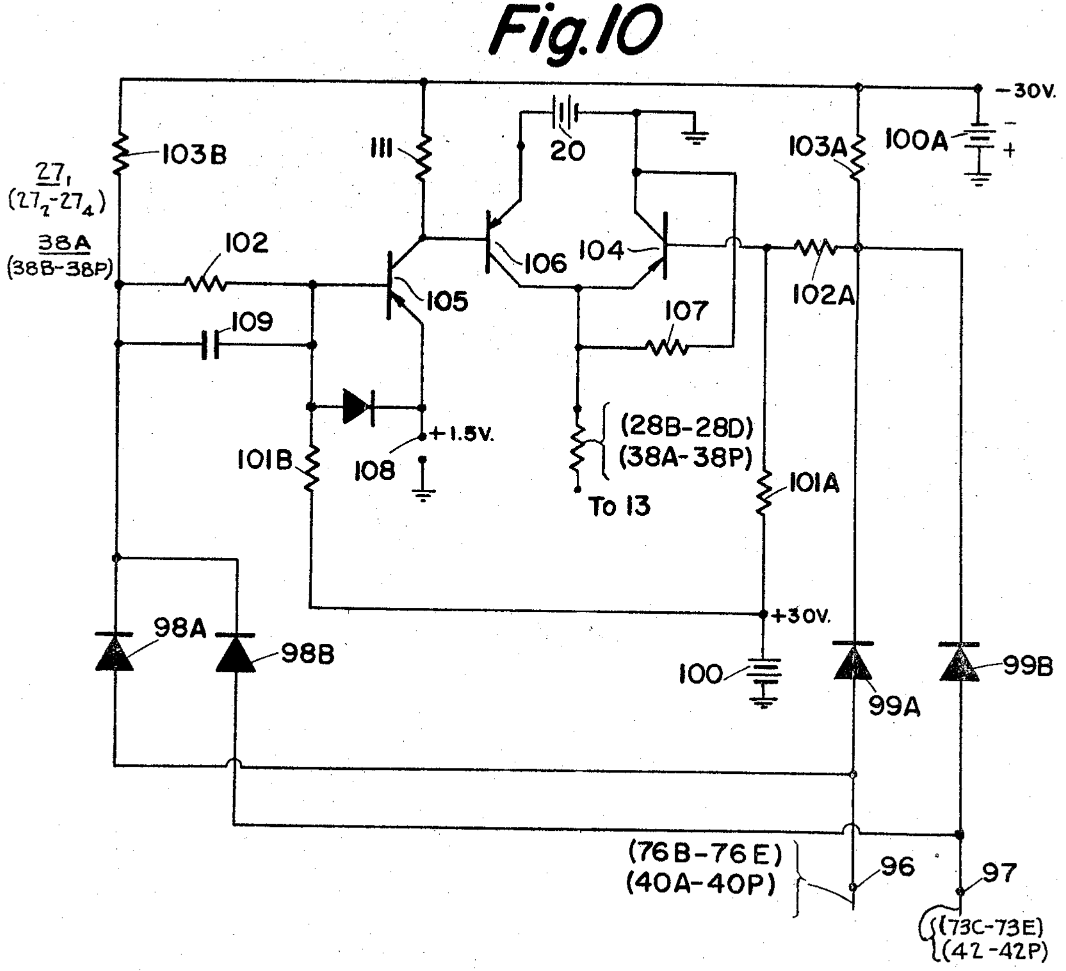
Figure 12:
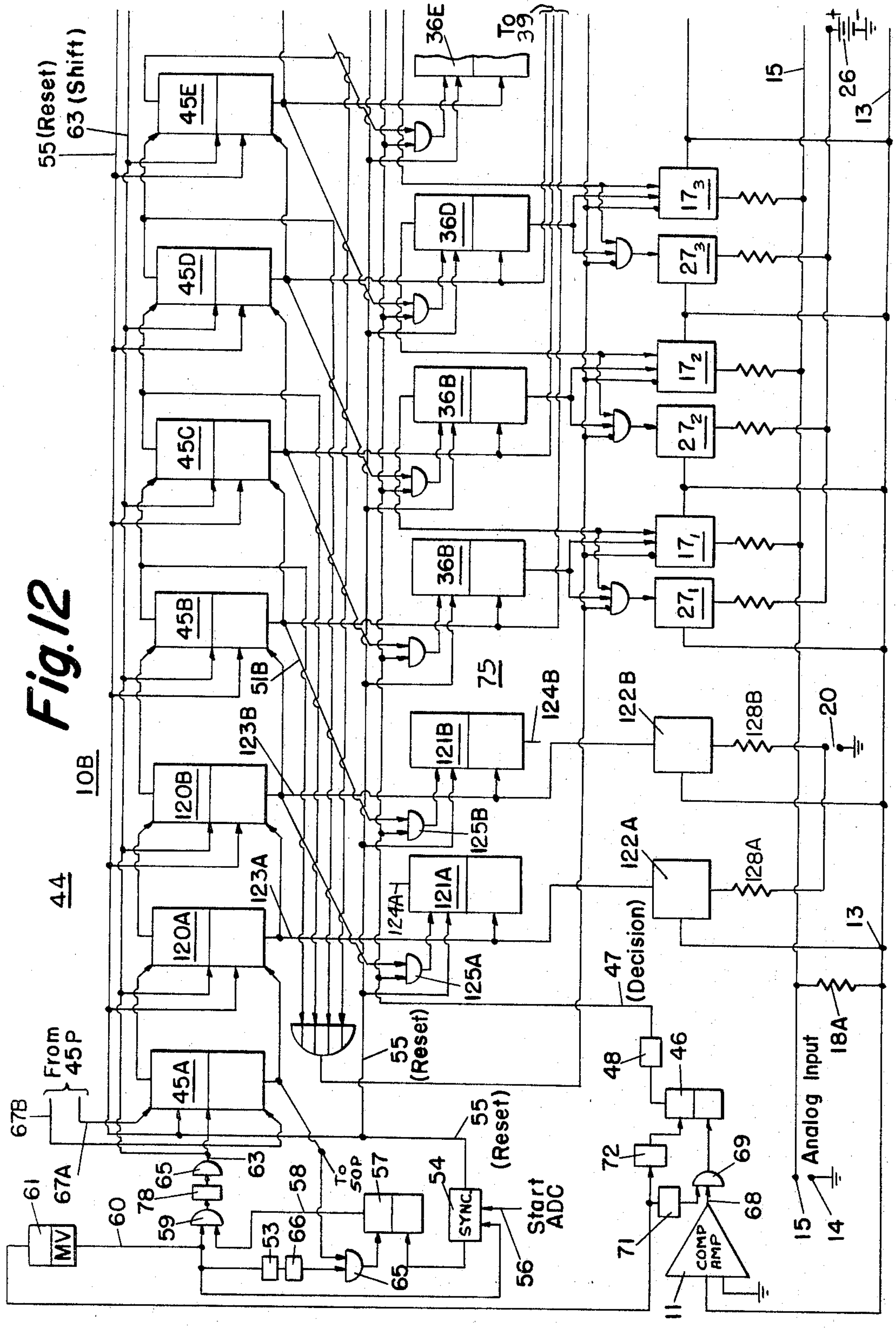

FIG. 7 schematically illustrates a simple manually-operable system suited for performance of method steps of the invention;

FIGS. 8A and 8B jointly constitute the logic block diagram of a high-speed automatic system suited automatically to perform method steps of the invention;

FIGS. 9 and 10 are schematics of solid-state circuits suited for use as switches indicated in block form in FIGS. 8A, 8B;

FIG. 11 schematically illustrates a diode matrix shown in block form in FIG. 8A; and FIG. 12 is a modification of FIG. 8A which additionally checks whether the measured variable is above or below preset alarm points.

Figure 1:
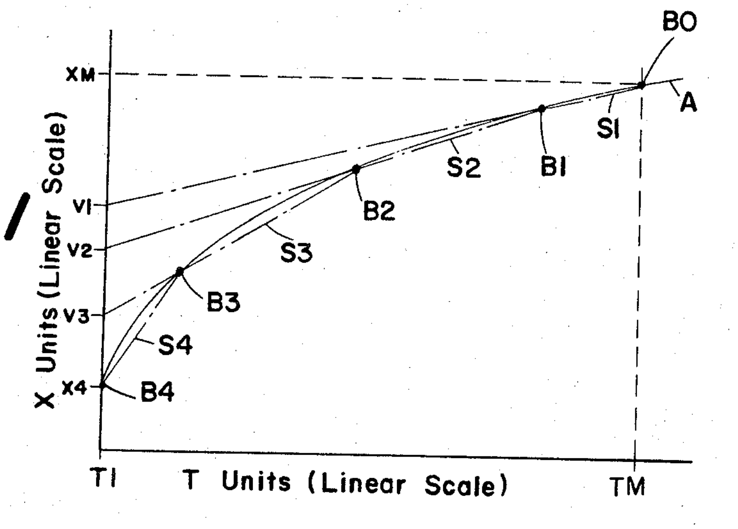
FIG. 1 is an explanatory figure including the non-linear response curve of a transducer.

Many transducers responsive to a measured variable, such as temperature, flow, pressure, or the like, produce an analog signal whose magnitude varies as a non-linear function of changes in magnitude of the variable. By way of example, the solid-line curve A of FIG. 1 is exemplary of the response curve of such a transducer. Equal increments of the variable T within the range T1 to TM produce unequal increments of the transducer-output signal X within the range X4 to XM.

For purposes of the present invention, the non-linear curve A is considered as closely approximated by a series of straight-line segments S1–S4 having different slopes. In the particular case shown in FIG. 1, the first segment S1 extends between the pair of breakpoints B0, B1 of curve A: the second segment S2 extends between the pair of breakpoints B1, B2: the third segment S3 extends between the breakpoints B2, B3: and the fourth segment S4 extends between the breakpoints B3, B4. The segments S1 to S4 as extrapolated to extend to the signal or vertical axis intersect the signal axis at points V1, V2, V3, V4.

Referring now to FIG. 7, the analog-to-digital converter (ADC) 10 comprises a high-gain amplifier 11 whose input impedance 12 is connected between a summing point 13 and ground 14. The summing point 13 is connected to input terminal 15 of the ADC 10 by series-resistance means 16 whose effective value may be adjusted in steps by the switching means 17. In the particular arrangement shown in FIG. 7, the resistance means 16 is composed of five resistors 18A–18E and the switching means 17 is a five-position switch for selectively connecting slope-determining resistors 18A–18E between the summing point 13 and input terminal 15 of the ADC. Thus, for all positions of switch 17, application of a voltage EX to the input terminals 14, 15 of the ADC will produce flow of current IX to the summing points 13, the proportionality factor between voltage EX and current IX depending upon the selected effective value of resistance means 16.

Reverting to FIG. 7, to the summing point 13 is also applied a current ID derived from a constant-voltage source exemplified by battery 20 and adjustable by resistance means 21 in the digital steps of a decimal scale. Specifically in the arrangement shown in FIG. 7, the resistance means 21 comprises the five groups 22A–22E of decade resistors. Any one of five groups may be connected, as by switch means 23, between the summing junction 13 and the source 20 of voltage ED. For digital readout to four decimal places (i.e., 9999), each of the groups 22A–22E includes four linearly-tapped resistors 24A–24D each associated with a ten-point switch to provide for adjustment of its effective value in nine equal steps from positions 0 to 9 of its associated decade switch. The total value of each of the successive resistors 24B–24D of each of the groups 22A–22D is greater by the factor 10 than the total value of the preceding resistor: i.e., assuming R is the resistance value of the smallest incremental step; the total resistance value of each of resistors 24A is 9R: of each of resistors 24B is 90R: of each of resistors 24C is 900R: of each of resistors 24D is 9,000R.

In calibration of the ADC 10 for a transducer having a characteristic exemplified by FIG. 1, fixed voltages equal to the minimum and maximum signals (X4 and XM) of the transducer for the range T1–TM are alternately applied to input terminals 14, 15 of the ADC. With the switches 17 and 23 set to their #0 position, values of resistor 18A and voltage ED are then selected for which the currents IX, ID are equal in magnitude and opposite in direction both for the applied voltage X4 at a zero count setting of resistor-bank 22A and for applied simulated signal voltage XM at the maximum count setting CM (say 9999) of that bank. Since currents IX, ID flow in opposite directions through input impedance 12 to the summing point, their balance corresponds with zero output of the amplifier as checked by a suitable Decision meter or relay device 25. This establishes for resistance means 21 adjustment of current ID in equal counting steps from 0 to say 9999 along the straight-line curve MO (FIG. 2) of such slope that it intersects the curve A at the breakpoints B0, B4 defining the total range of measurement of variable T for the range T1 to TM.

It is to be noted that, as so far explained, the registered digital count (FIG. 2) for balance of IX and ID for a signal magnitude X1 corresponding with the breakpoint B1 of curve A would be C1′ whereas the true count is C1; magnitude X2 corresponding with breakpoint B2 of curve A would be C2′ whereas the true count is C2; for a signal magnitude X3 corresponding with breakpoint B3 of curve A would be C3′ whereas the true count is C3. Nevertheless with the switch 17 in its #0 position and the transducer 29 connected to the input terminals, any register count for balance of IX and ID in the range of C1′–$C_{max.}$ indicates that its output signal is between the breakpoints B1 and B0 of curve A: any register count in the range C1′–C2′ indicates the transducer output-signal magnitude is between breakpoints B1 and B2 of curve A; any register count in the range C2′–C3′ indicates the magnitude of the input signal is between breakpoints B2 and B3 of curve A and any register count in the C3′–C0 range indicates the magnitude of the ADC input signal to be between breakpoints B3, B4 of curve A.

Reverting to the calibration procedure; the switch 17 is set to its #1 position to replace or shunt the now-set slope resistor 18A by adustable resistor 18B and the switch 23 is set to its #1 position to connect the second group of decade resistors 22B to the summing junction 13. There is now supplied to the summing point 13 a third current IB which in the particular arrangement shown may be derived from source 26 of voltage EB which for the #1 position of switch 27 is connected to the summing point 13 via resistor 28B of resistance means 34. Simulated signal voltages XM and X1 are repeatedly alternately applied to input terminals 14, 15 of the ADC respectively for CM and C1 count settings of resistors 24A–24D of decade group 22B and the settings of resistors 18B and 28B are adjusted for balance $$(IX+IB=ID)$$

at both points XM, CM and X1, C1.

There is thus established the straight-line reference curve M1 (FIG. 3) having such slope that it passes through the breakpoints V1 and B0 of curve A and intersects the vertical or signal ordinate at offset value B1 as does segment S1 of FIG. 1.

Accordingly, with the switches 17, 27 set in their #1 position for now-calibrated values of resistance means 16 and 34, the count registered by the second group 22B of decade resistors in the range from C1 to CM for balance of currents IX, ID, IB for any unknown signal voltage EX in the range X1 to XM is essentially a true count within the prescribed limit of such maximum errors set by the chosen length of segment S1.

Figure 4:
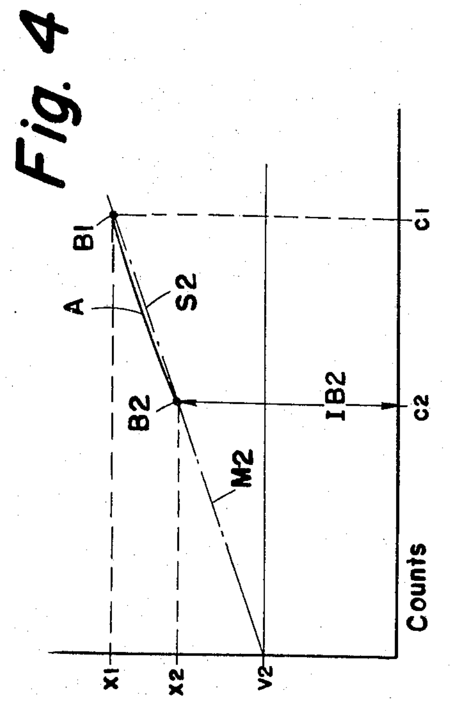

Again reverting to the calibration procedure for its next step, the switch 17 is set to its #2 position to replace or shunt the now-set slope resistor 18B by adjustable resistor 18C; the switch 23 is set to its #2 position to connect the third group of decade resistors 22C to the summing junction 13; and the switch 27 is set to its #2 position to connect adjustable resistor 28C between the summing point 13 and source 26 of voltage EB. Simulated signal voltages X1 and X2 are repeatedly alternately applied to input terminals 14, 15 of the ADC 10 respectively for C1 and C2 count settings of resistors 24A–24D of decade group 22C, and the settings of resistors 18C and 28C are adjusted to attain balance $(IX+IB=ID)$ for both points X1, C1 and X2, C2. There is thus established the straight-line reference curve M2 (FIG. 4) having such slope that it passes through the breakpoints B1, B2. There is thus established the straight-line reference curve M2 (FIG. 4) having such slope that it passes through the breakpoints B1, B2 of curve A and intersects the signal axis at offset value V2 as does segment S2 of FIG. 1.

Accordingly, with the switches 17 and 27 set in their #2 position for the now-calibrated values of resistance means 16 and 34, the count registered by the third group decade 22C in the range from C1 to C2 for balance of currents IX, ID, IB for any unknown signal voltage from transducer 29 in the range X1 to X2 is essentially a true count within the prescribed limit of small maximum error set by the chosen length of segment S2.

Again reverting to calibration procedure, the switch 17 is set to its #3 position to replace or shunt the now-set slope resistors 18B, 18C by adjustable resistor 18D; the switch 23 is set to its #3 position to connect the fourth group of decade resistors 22D to the summing point 13; and the switch 27 is set to its #3 position to connect adjustable resistor 28D between the summing point 13 and the source 26 of voltage EB. Simulated signal voltages X2 and X3 are repeatedly alternately applied to input terminals 14, 15 of ADC 10 for the C2 and C3 count settings of resistors 24A–24D of decade group 22D. The settings of resistors 18D and 28D are adjusted to attain balance of the currents IB, ID, IX for both poins X2, C2 and X3, C3. There is thus established the straight-line reference curve M3 having such slope that it passes through the breakpoints B2, B3 of curve A and intersects the signal axis at offset value V3 as does segment S3 of FIG. 1.

Accordingly, with the switches 17 and 27 in their #3 position for the now-calibrated values of resistance means 16 and 34, the count registered by the fourth decade group 22D in the range from C2 to C3 for balance of currents IX, ID, IB for any unknown signal-voltage output of transducer 29 is, within the range X2 to X3, essentially a true count within the maximum tolerance prescribed by the chosen length of segment S3.

Reverting to the calibration procedure for description of its final step, the switch 17 is set to its #4 position to replace or shunt the now-set slope resistors 18B–18D by adjusting resistor 18E; the switch 23 is set to its #4 position to connect the fourth group of decade resistors 22E to the summing point 13; and the switch 27 is set to its #4 position to connect the adjustable resistor 28E between the summing point 13 and the voltage source EB. Simulated signal voltages X3 and X4 are repeatedly alternately applied to input terminals 14, 15 of ADC 10 respectively for the C3 and C0 (say zero) count settings of resistors 24A, 24D of decade group 22E. The settings of resistors 18E and 28D are adjusted to attain balance of the currents IB, ID, IX for both points X3, C3 and X4, C0. There is thus established the straight-line reference curve M4 having such slope that it passes through the breakpoints B3, B4 of curve A and intersects the signal axis at offset value V4 as does segment S4 of FIG. 1.

Accordingly, with the switches 17 and 27 set in the #4 position for the now-calibrated values of resistance means 16 and 34, the count registered by the fifth group 22E of decade resistors in the count range from C3 to zero for balance of currents IB, IX, ID is, for any unknown output of transducer 29 in the range from X3 to X4, essentially a true count within the small maximum tolerance prescribed by the chosen length of segment S4.

For subsequent use of the ADC 10 with any transducer 29 having the non-linear characteristic curve A of FIG. 1, the decade groups 22A–22E are respectively set to the counts CM, C1, C2, C3 and C0. With the switches 27 and 17 each in its #0 position, the switch 23 is successively stepped to its #0–#4 positions to determine whether the existing magnitude of the transducer signal is above breakpoint B0, between the breakpoints B1, B0, between the breakpoints B2, B1, between the breakpoint B2, B3, or between the breakpoints B3, B4. If, for example, it has been determined that the existing magnitude of the variable is between the breakpoints B1, B0, the switches 17, 27 are both set to their #2 positions to establish the slope and offset relations of FIG. 3, and the resistors of decade group 22B are then adjusted by manipulation of their decade switches until the device 25 indicates balance of the currents IX, IB, ID at or between two adjacent count settings of the unit resistor 24A of group 22B so to obtain a true decimal digit count corresponding with the magnitude of variable T as linearized in compensation for the non-linearity of the transducer response curve A. If, on the other hand, it has been determined by the scanning operation of switch 23, with switches 17 and 27 each in its #0 position, that the existing magnitude of the transducer signal is between the breakpoints B2, B3, the switches 17, 27 are both set to their #3 position to establish the slope and offset relations of FIG. 5. The resistors of decade group 22D are adjusted by manipulation of their decade switches to obtain balance at or between two adjacent count settings of Unit resistor of group 22D. There is thus obtained a true decimal digit count indicative of the magnitude of variable T as linearized in compensation for the nonlinearity of the transducer response curve A. In like manner, for any transducer output signal in the range $X_M$–$X_4$, a true decimal digit count linearized in terms of the variable T can be obtained by first determining which of the linear segments S1–S4 spans the signal magnitude, setting the calibrated resistance means 16 and 34, as by switches 17, 27, to introduce the proper slope and offset, and then adjusting the corresponding decade bank for balance of the currents IX, ID, IB at the summing point 13.

In the high-speed automatic ADC 10A shown in FIGS. 8A, 8B, components are, for the most part, identified by the same reference characters used to identify components of a manually-operable ADC such as shown in FIG. 7. It is assumed the slope resistors 18A–18E and the offset resistors 28B–28E of FIG. 8A have been precalibrated to afford the straight-line references M0–M4 discussed in connection with FIGS. 2–6.

The offset switch means of FIG. 8A for the offset resistors 28B–28D comprises the switches $27_1$–$27_4$ respectively controlled by the AND-gates 30B, 30C, 30D and 30E. Switches $27_1$–$27_4$ may be electronic switches or may be high-speed electromagnetically-operated switches. Gates 30B–30E are inhibited by the voltage level on line 31 until after it has been determined between which pair of breakpoints B0–B4 of curve A the signal-voltage from one of the transducers then connected to input terminals 14, 15 of the ADC lies. In FIG. 8A, the switch means 17 for the slope resistors 18B–18E comprises the switches $17_1$–$17_4$ which may be of the electronic type or of high-speed electromagnetically-operated type. The slope resistor 18A (FIG. 8A) is continuously in circuit between the summing point 13 and the ungrounded input terminal 15 of the ADC, although any combination of resistors for 18A to 18E to produce the desired slope would suffice. Switches $17_1$–$17_4$, as later described, are turned ON under control of the flip-flops 36B–36E to effect predetermined step-variation of the proportionality factor between IX and the signal voltage EX, as are also the switches $27_1$–$27_4$ which effect predetermined step-variation of the magni- The function of the switch 23 and all the decade switches of resistance means 21 of FIG. 7 are performed in FIG. 8B by the single series of sixteen ID switches 37A–37P which respectively connect the resistors 38A–38P between the summing point 13 and ID reference source 20. These switches and resistors may be considered as divided into four groups, each having four stages to afford a coded binary count to four decimal places.

The ON–OFF states of switches 37A–37P are controlled for breakpoint testing in grouping determined by the coding set in a matrix 39, such as the later-described diode matrix 39 of FIGURE 11. For analog-to-digital conversion, the switches 37A–37P are respectively controlled by the flip-flops 41A–41P which in turn are respectively controlled, as later described, by the flip-flop stages 43A–43P of a shift-register or ring-counter 44 for the ADC conversion. The preceding four stages 45B–45E of the ring-counter 44 are utilized to control the flip-flops 36B–36E of the feedback register 75 and to supply inputs to diode matrix 39 for breakpoint testing. The dummy stage 32 is interposed between the group 45B–45E and 43A–43P to provide an interval in which selected slope and offset switches $27_1$–$27_4$, $17_1$–$17_4$ are turned ON. The first stage 45A of the ring-counter 44 is a dummy stage involved in determining the end of a conversion cycle.

More particularly at the Start of the conversion cycle, a pulse is produced from the synchronizer 54. This pulse by way of line 55 will reset (turn OFF) the flip-flops of feedback-register 75 which register contained the previous conversion information; the pulse resets the ring-counter 44 which may have never had a "1" set into 45A or has erroneously added extra "1's" to some other stage. After such reset by line 55 and in synchronism with the free-running multivibrator 61, flip-flop 57 is turned ON. This permits AND-gate 59 to pass the multivibrator signal on line 60 to differentiator 78 which produces a pulse when the multivibrator 61 changes level (say negative) in one direction. This pulse is sent to the shift driver 64, producing a shift pulse on line 63 which will shift the ring-counter 44 one stage per pulse.

Multivibrator output is also differentiated by differentiator 53, producing a pulse when the multivibrator changes level in one direction (say negative). This pulse is delayed by delay device 66 to provide sufficient delay after a shift pulse on line 63 to insure that register 44 has completed shifting. This delayed signal, as applied to AND-gate 65, is used to interrogate the state of the dummy register stage 45A.

Thus, after a Start signal occurs on line 56, a shift will occur causing output line 51A of Stage 45A to prevent turning OFF flip-flop 57 which was turned ON by the synchronizer 54. flip-flop 57 will only be turned OFF after a sufficient number of shift pulses on line 63 has been provided to shift the "1" circulating in ring-counter 44 back to stage 45A ending the conversion. The start signal may occur substantially concurrently with connection of one of the transducers 29, directly or through a preamplifier, to the input terminals 14, 15 of the ADC.

The output on the opposite side of the multivibrator 61 on line 70 is applied via the delay and differentiating devices 71, 72 respectively to the comparator gate 69 and to the Decision flip-flop 46. The delay afforded by device 71 occurs more than one-half multivibrator cycle after a shift pulse and as close to one cycle as possible: the delay afforded by device 72 is greater than 1 cycle, i.e., the pulse applied to the comparator gate 69 occurs at the end of one shift-pulse cycle and the pulse applied to the Decision flip-flop 46 occurs in the following shift-pulse cycle delayed long enough to insure the completion of the shifting operation. The comparator gate is an AND-gate which will produce an output when a pulse occurs from device 71 and the output of the comparator is below a specific level.

The Decision flip-flop 46 is in the output circuit of the comparator amplifier 11, and like device 25 of FIGURE 7 responds to balance of the currents supplied to the summing point 13 in the input circuit of the amplifier. When the flip-flop 46 is turned ON via comparator gate 69, its change in state as differentiated by differentiator 48 results as a pulse on the Decision line 47. This signal pulse is applied to one of the input circuits of the AND-gates 49B–49E, 50A–50P.

With the Decision line 47 activated, the occurrence of a "1" signal on output line 51C of stage 45C of the ring-counter 44 resets flip-flop 36B which had been set by a "1" signal in stage 45B. Such resetting occurs because with line 47 activated, all inputs of AND-gate 49B are then at the "1" level. The flip-flops 36C–36E are each similarly reset assuming Decision line 47 is activated via the respective AND-gates 49C-49E when a signal appears on the "1" output lines 51D, 51E, 51F on successive stages 45D, 45E, 32 of the ring-counter 44.

As soon as there is no Inhibit signal on line 31, the gate 30B will pass a TURN-ON signal to Slope-switch $27_1$ if flip-flop 36B is in the ON state and flip-flop 36C is in the OFF state: the gate 30C will pass an ON signal to Slope-switch $27_2$ when flip-flop 36C is in the ON state and flip-flop 36D is in the OFF state: and the gate 30D will pass a TURN-ON signal to switch $27_3$ when flip-flop 36D is in the ON state and flip-flop 36E is in the OFF state. Thus, the slope resistor 18A is unshunted if none of switches $27_1$–$27_3$ is turned ON; is shunted by resistor 28B when switch $27_1$ is turned ON; is shunted by resistor 28C if switch $27_2$ is turned ON; shunted by resistor 28D if switch $27_3$ is turned ON; and is shunted by resistor 28E if switch $27_4$ is turned ON.

As soon as there is no Inhibit signal on line 31, the Offset switch $17_1$ is turned ON when flip-flop 36B is ON and flip-flop 36C is OFF: the Offset-switch $17_2$ is turned ON when flip-flop 36C is ON and flip-flop 36D is OFF; and switch $17_3$ is turned ON when flip-flop 36D is ON and flip-flop 36E is OFF. When switches $17_1$–$17_4$ are respectively turned ON, the magnitudes of current IB supplied to the summing point 13 from reference 26 respectively correspond to the breakpoints B1, B2, B3, B4 of curve A. When an Inhibit signal is on line 31, none of the switches $17_1$–$17_4$, $27_2$–$27_4$ is closed regardless of the states of the flip-flops 36B–36E.

The magnitude of current ID corresponding with the breakpoints B1, B2, B3, B4 of curve A are encoded in the matrix 39 such as later described. For the time being, it can be assumed that when the ring-counter stage 45B is turned ON to produce "1" level on the input line 51B of the matrix 39 that a certain combination of switches 37A–37P will be turned ON with resultant inclusion of that particular combination of selected resistors 38A–38P in shunt between the summing point 13 and reference 20 which produces a value of current ID which is representative of breakpoint B1. Similarly, when ring-counter stage 45C is turned ON, so to produce a "1" level on input line 51C of matrix 39, a different combination of switches 37A–37P is turned ON to select that different combination of resistors 38A–38P which produces a current ID of magnitude representative of breakpoint B2. Similarly, when ring-counter stage 45D is turned ON to activate input line 51D of matrix 39, a still different combination of switches 37A–37P is turned ON to select the combination of resistors 38A–38P which produces a magnitude of current ID which is representative of breakpoint B3. Lastly, when ring-counter stage 45E is turned ON to activate input line 51E of matrix 39, there is turned ON that combination of switches 37A–37P which selects that combination of resistors 38A–38P which produces a magnitude of current ID representative of breakpoint B4.

When, as described above, the flip-flop 45A is turned OFF by a shift pulse, it remains OFF. The same shift pulse as applied to flip-flop 45B (plus the signals then on the steering lines 67A, 67B from flop-flop 45A) turns ON the flip-flop 45B so that a "1" signal now appears on its output line 51B. This signal level as applied to the matrix 39 produces, as above stated, an ID current level corresponding with breakpoint B1 of curve A. If the IX current is above that ID level, the output level of the comparator amplifier 11 does not enable input line 68 of AND-gate 69 and Decision flip-flop 46 is not turned ON for reasons above given. If, on the other hand, the IX current is below the ID current level, the AND-gate 69 is enabled by the level on output line 68 of the comparator amplifier 11 to turn ON the Decision flip-flop 46.

There is now considered the relationships thus far established between the first flip-flop 36B of the feedback register 75 comprising flip-flops 36B–36E, 41A–41P and the first breakpoint stage 45B of the ring-counter 44. Initially the first flip-flop 36B (like all of the others of the feedback register) is in the OFF state for which there is a $\bar{1}$ level on its output line 76B. When the flip-flop 45B was turned ON, the "1" level on its output line 51B turned the feedback flip-flop 36B to its ON state. Flip-flop 36B is left in the ON state if it has been determined that IX is above breakpoint B1. If it has been determined that IX is below breakpoint B1, the flip-flop 36 is turned OFF as below described.

When the next, or second, shift pulse appears on line 63, the flip-flop 45B is turned OFF and the flip-flop 45C is turned ON. The consequent appearance of a "1" level on line 51C is effective, as applied to matrix 39, to produce, as previously stated, an ID current level corresponding with breakpoint B2 of curve A. The "1" level on output line 51C of the flip-flop 45C is also applied to the AND-gate 49B. If the Decision line 47 is then inactive, the flip-flop 36B remains ON with a "1" level on its output line 76B. If, on the other hand, the Decision line 47 is then active, both input circuits of the AND-gate 49B are active; the flip-flop 36B is consequently reset to its original state for which its output line 76B has a $\bar{1}$ signal level and remains in that state for the rest of the ADC cycle.

Figure 2:
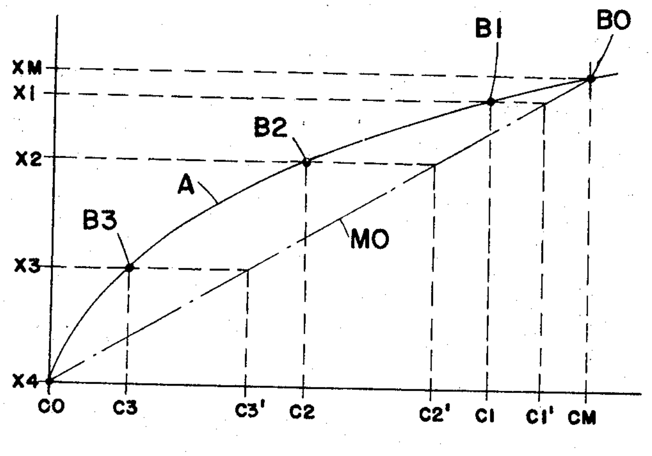
FIGS. 2 to 6 are explanatory figures respectively including successive segments of the non-linear response curve of FIG. 1.

In brief, if at this point the level on output line 76B of flip-flop 36B is 1, it has been determined that the signal from the transducer 29 has a value at or above the breakpoint B1 of curve A (FIG. 3) whereas if the level on that line is $\bar{1}$, it has been determined that the transducer signal is on some yet undetermined lower segment of curve A (FIGS. 1 and 2).

When the next, or third, shift pulse appears on line 63, the flip-flop 45C is turned OFF and the flip-flop 45D is turned ON. The consequent appearance of a 1 level on line 51D is effective, as applied to matrix 39, to produce, as previously stated, an ID current reference level corresponding with breakpoint B3 of curve A (FIGS. 1 and 2). The 1 level on output line 51D is also applied to the AND-gate 49C. If the Decision line 47 is inactive, the flip-flop 36C remains ON with a "1" level on its output line 76C. If, on the other hand, the Decision line 47 is active, both input circuits of the AND-gate 49C are active; the flip-flop 36C is reset to its original state for which its output line 76C has a $\bar{1}$ signal level and remains in that state for the rest of the measuring phase of the ADC cycle.

In brief resumé, it has now been further determined by the third check that either the transducer signal lies between the breakpoints B1, B2 of curve A (FIG. 4), or is on some yet undertermined lower segment of curve A (FIGS. 1 and 2).

When the next, or fourth, shift pulse appears on line 63, the flip-flop 45D is turned OFF and flip-flop 45E is turned ON. The consequent appearance of a 1 level on line 51E is effective, as applied to matrix 39, to produce an ID current reference level corresponding with breakpoint B4 of curve A. The 1 level on output line 51E is also applied to the AND-gate 49D. If the Decision line 47 is inactive, the flip-flop 36D remains ON with a 1 level on its output line 76D. If the Decision line 47 is active, both input circuits of the AND-gate 49D are active; the flip-flop 36C is reset to its original state for which its output line 76C has a $\bar{1}$ signal level and remains in that state for the rest of the complete ADC cycle.

Figure 5:
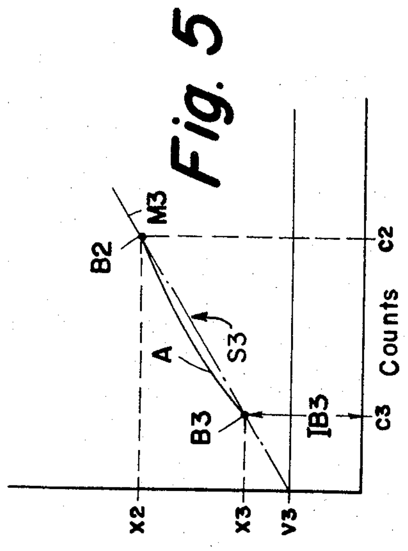
Figure 6:
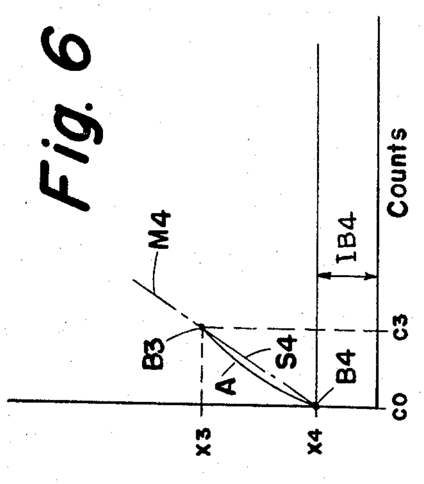

In brief resumé of this fourth check, it has been further determined either that the transducer signal lies between the breakpoints B2, B3 of curve A (FIG. 5) or lies between the breakpoints B3, B4 (FIG. 6).

When the next, or fifth, shift pulse appears on line 63, the flip-flop 45E is turned OFF and dummy flip-flop 32 is turned ON. The consequent 1 level on line 51F is applied to AND-gate 49E. If the Decision line 47 is inactive, the flip-flop 36E remains ON with a 1 level signal on its output line 76E. If, on the other hand, the Decision line 47 is active, both input circuits of AND-gate 49E are active; the flip-flop 36D is reset to its original state for which its output line has a $\bar{1}$ signal level and remains in that state for the rest of the ADC cycle.

In brief resumé of the fifth check, it has been further determined that the existing transducer signal lies beyond breakpoint B4.

This completes the breakpoint-check phase of the measuring cycle, and so it has been determined, as discussed in connection with FIG. 2, between which pair of breakpoints lies the actual value of the transducer signal. Thus far, there has been no conversion of the analog value of the transducer signal to a digital count with or without linearization.

Figure 3:
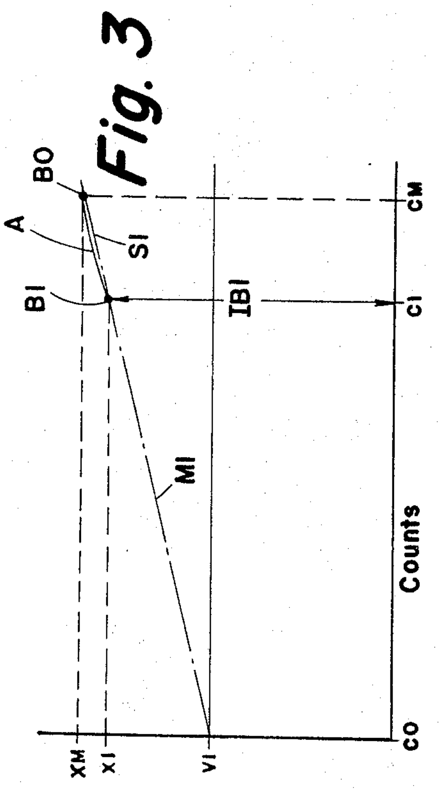

Upon completion of the breakpoint testing above described, the flip-flops 36B–36E of the feedback register 75 are interrogated to determine which of the switches $17_1$–$17_4$, $27_1$–$27_4$ should be turned ON for linearization of the analog-to-digital conversion of the transducer output. If at the time of interrogation:

(a) all of the flip-flops 36B–36E are set, i.e., have a $\bar{1}$ signal on their output lines 76B–76E; none of the slope switches $17_1$–$17_3$ is turned ON and either slope switch $17_4$ is turned ON or the slope register 18A may be preselected for the value of M4 (FIG. 6); the switch $27_4$ is turned ON to produce the current IB with the corresponding Offset X4 for reference curve M4 (FIG. 6);

(b) the flip-flop 36D has a 1 signal on its output line 76D, the slope switch $17_3$ and the Offset switch $27_3$ are turned ON to provide reference curve M3 FIG. 5);

(c) the flip-flop 36C has a 1 signal on its output line 76C, the slope switch $17_2$ and Offset switch $27_2$ are turned ON to provide reference curve M2 (FIG. 4); and (d) if flip-flop 36B has a 1 signal on its output line 76B, the slope switch $17_1$ and Offset switch $27_1$ are turned ON to provide reference curve M1 (FIG. 3).

The interrogation occurs after the 1 initially inserted in ring-counter 44 has been advanced into the dummy stage 32 preceding the conversion stages 43A–43P of the ring-counter. As soon as the flip-flop 32 is turned ON, the line 31 no longer inhibits AND-gates 30B–30E, permitting the proper slope switch 17 and Offset switch 27 to be turned ON. The dummy stage 32 provides an interval sufficiently long for the interrogation and setting of the selected switches. This completes the second phase of the converter cycle. After sufficient delay, the dummy stage 32 permits resumption of operation of the ring-counter.

In the third and final phase, the flip-flops 43A–43P of the ring-counter 44 are each successively turned ON and then OFF to advance the 1 signal in the ring-counter to the next flip-flop for each of the successive shift pulses. As each of these flip-flops is turned ON, the 1 level on its output line 52 turns ON the companion feedback flip-flop 41 to connect a corresponding one of the ID resistors 38 between the summing point 13 and the reference 20 to check whether or not it is to be left in circuit for the finalized count. If not, the coincidence of pulses on the Decision line 47 and the output line 52 from the next stage of the ring-counter 44 turns OFF that feedback flip-flop via the associated AND-gate 50. For example, if in a particular measurement the analog value of IX corresponds with a true or linearized count of 3571, the ID switches left turned ON for readout are 38P of the units group 38M–38P, 38J, 38K, 38L of the tens group 38I–38L, 38G, 38H of the hundreds group 38E–38H; and 38C–38D of the thousands group 38A–38D. It is here to be noted that the foregoing conversion for decimal-digit conversion is based on the 8421 code. However, the measuring phase of the conversion cycle can be performed with different circuitry for binary-digit count, or a decimal-digit count based on other codes, for example, the 4221 code used in the ADC of Benner et al. Patent 3,145,374.

Suitable high-speed solid-state circuitry for each of slope switches $17_1$–$17_4$ of FIG. 8A is shown in FIG. 9. The collector of transistor 90 is connected to the summing point 13. The slope resistor 18B for switch $17_1$, for example, is connected between the emitter of the transistor and the input terminal 15 of the ADC. The collector of the transistor is connected to the summing point 13 and also, via resistor 91, to the adjustable tap of potentiometer 92. The potentiometer settings for different switches may be somewhat different to compensate for the offset voltage of the respective transistors. The TURN-ON signals "1" for the switch are applied to the base of transistor 90 via the AND-gate provided by the diodes 92A, 92B, 92C, resistor 94 and the Zener diode 93 which precludes false turn-on by spurious signals due to circuit noise. The base of the transistor is also connected through resistor 95 to a bias source.

Suitable high-speed solid-state circuitry for each of the Offset or IB switches $27_1$–$27_4$ and for each of the ID switches 37A–37P of FIGS. 8A, 8B is shown in FIG. 10. Such circuitry is disclosed and claimed in copending Garden application, Serial No. 95,714, filed Mar. 14, 1961 (see FIG. 3 thereof) upon which has issued Letters Patent 3,226,708. In brief, when a positive-going signal level (i.e., an inverted 1 signal from a flip-flop) is applied to either of the input terminals 96, 97, the switch is turned ON and a corresponding one of the resistors 28B–28D, 38A–38P is effectively connected between the summing point 13 and the source 20 or 26 (as the case may be): when a negative-going signal level is applied to either of the input terminals 96, 97, the switch is turned OFF.

More particularly, when a negative-going signal ($\bar{1}$) is applied to each of the input terminals 96, 97 of the switch, none of the diodes 98A, 98B, 99A, 99B is conductive. For this circumstance, the supply voltages 100 and 100A are effective to supply current through the circuit including resistors 101A, 102A, 103A. Accordingly, the base of transistor 104 is negative with respect to the collector and that transistor is turned ON connecting resistors 28A–28D, 38A–38P to ground and so preventing any current from flowing to summing junction 13. Also for this circumstance, the supply voltages 100 and 100A are effective to supply current through the circuit including resistors 101B, 102B, 103B. Accordingly, the base of transistor 105 is more negative than the emitter and it also is turned ON. With transistor 105 turned ON, the transistor 106 is non-conductive and no current from source 20 or 26 is supplied to the summing point 13 via the resistor 28 or 38 as the case may be.

When a positive signal (going to ground from a negative voltage) is applied between ground and either of the input terminals 96, 97, a corresponding pair of diodes 98A, 99A or 98B, 99B is conductive. In either case with diode 98A conductive, it provides a current path through diode 98A which makes the base of transistor 105 positive with respect to its emitter. Consequently, the transistor 105 is turned OFF. The diode 110 protects the emitter-base junction of transistor 105 from switching transients which might otherwise damage that junction: the capacitor 109 is provided to speed up the turning ON of transistor 105. With transistor 105 non-conductive or OFF, the emitter of transistor 106 is positive with respect to the point of connection of its base to the ungrounded side of resistor 28 or 30 and consequently transistor 106 is turned ON to supply current from source 20 (26) to the summing point 13 via the resistor 28 or 38 as the case may be. When diode 98A is conductive, diode 99A is conductive also, making the base of transistor 104 positive with respect to its collector turning it OFF.

A suitable form of matrix 39 of FIG. 8A is shown in FIG. 11. A 1 level signal appearing on output line 51B from stage 45B of ring-counter 44 is passed by a first group of one or more diodes 112 of lines 40A–40P which turns ON the proper combination of switches 37A–37P which affords an ID current representative of breakpoint B1 of curve A. A 1 level signal appearing on output line 51C of ring-counter 44 is passed by a second group of one or more diodes 113 to that second and different combination of lines 40A–40P which turns ON a correspondingly different combination of switches 37A–37P which provides an ID current representative of breakpoint B2 of curve A. A 1 signal level on output line 51D from stage 45D of counter 44 is passed by a third group of diodes 114 which turns ON a third different combination of switches 37A–37P to provide an ID current representative of breakpoint B3 of curve A. A 1 signal level on output line 51E from stage 45E of counter 44 is passed by a fourth group of one or more diodes 115 which turns ON the appropriate number of particular switches of the group 37A–37P to provide an ID corresponding with breakpoint B4 of curve A.

It will be understood that the number of input lines of the diode matrix 39 may be greater or less than the particular case under discussion depending upon the number of breakpoints required to effect linearization of the analog-to-digital conversion for different transducers. It will also be understood the number of output lines 40A–40P will depend upon the number of digits in the maximum count.

In the modification of FIG. 8A shown in FIG. 12, the ring-counter 44 and the feedback register 75 have additional stages to check whether the IX current derived from the transducer is above or below alarm limits of the measured variable. This phase of the ADC conversion, whether or not linearized, is effected in FIG. 12 by flip-flops 120A, 120B of the counter flip-flops 121A, 121B of the feedback register and switches 122A, 122B.

When switch 122A, which may be of the high-speed solid-state type shown in FIG. 10, is closed or ON, the IB resistor 128A is connected between the summing junction 13 and the source 26. This resistor is of magnitude precalibrated to provide an IB current corresponding with the High alarm value of the transducer output signal. Similarly, when switch 122B is closed, the IB resistor 128B is connected between the summing junction 13 and the source 26. This latter resistor is precalibrated to provide an IB current corresponding with the low alarm value of the transducer output.

When in the ADC cycle a 1 is shifted into stage 120A, the 1 signal appearing on its output line 123A turns ON the switch 122A and sets the flip-flop 121A to produce a signal on its output line 124A. Specifically, if the IX current is of magnitude less than the IB current provided to the summing point 13 through resistor 128A, the 1 level on the Decision line 47 and the 1 level pulse appearing on the output line 123B of stages 120B are effective via AND-gate 125A almost immediately (i.e., after one cycle of multivibrator 61) to reset the flip-flop 121A (one of the states) and no High alarm is given. If, on the other hand, the IX current is of magnitude greater than the IB current through resistor 128A, the signal on the Decision line 47 is $\bar{1}$. In this case, the flip-flop 121A remains set (the other state) and its output persists to produce a High-alarm signal which is transferred to an alarm relay or external alarm logic (both not shown).

Also, when a 1 is shifted into stage 120B of the ring-counter, the 1 signal pulse appearing on its output line turns ON the switch 122B and sets the flip-flop 121B to produce a signal pulse on its output line 124B. Specifically, if the IX current is less than the IB provided to the summing point 13 through resistor 128B, the 1 level on the Decision line 47 and the 1 level pulse appearing on the output line of the next stage of the ring-counter are effective via AND-gate 125B almost immediately to reset the flip-flop 121B (one of the states) and a Low alarm signal is produced which is transferred to an Alarm relay or external alarm logic. If, on the other hand, the IX current is greater than the IB current through resistor 128B, the signal on the Decision line is $\bar{1}$. In this case, the flip-flop 121B remains set (the other state), producing no Low alarm signal.

As an alternative to the alarm arrangement specifically shown in FIG. 12, the diode matrix 39 may have additional input lines from stages 120A and 120B of the ring-counter 44 for turning ON the proper combinations of switches 37A–37P which respectively afford ID currents corresponding with High and Low alarm values of IX. In such case, the switches 122A, 122B and their associated resistors 128A, 128B are omitted and their function is performed by the selected combinations of switches 37A–37P and the associated resistors of the group 38A–38P. In short, the checking of alarm points is similar to the checking of breakpoints.

It is to be understood the invention is not limited to the specific systems disclosed and comprehends modifications and equivalents within the scope of the appended claims.

What is claimed is:

1. An analog-to-digital converter comprising a comparator amplifier having a current-summing junction in its input circuit and decision means in its output circuit for response to balance of currents to said junction, slope resistance means for connection between said junction and input terminals of the converter for traverse by analog current corresponding with the non-linear response characteristic of a transducer, a first switching means for varying the effective value of said slope resistance means in steps respectively effecting match to the slopes of straight-line segments respectively intersecting pairs of breakpoints of said non-linear characteristic of said transducer, means including a second switching means for supplying to said junction an offset current adjustable in steps to values respectively corresponding with said breakpoints, and count resistance means for connection between said junction and a reference source for supplying to said junction a reference current adjustable in digital steps by a third switching means for analog-to-digital conversion of the transducer output in terms of its input variable.

2. An analog-to-digital converter as in claim 1 in which said first, second and third switcihng means each comprises a series of switches and which additionally includes a shift-register including first and second groups of stages progressively set and reset by application of successive pulses of a conversion cycle to the register, a feedback register including first and second groups of flip-flops respectively set by the first and second groups of stages of said shift-register, a matrix having input lines from the respective flip-flops of said first group and having output lines to those switches of the third switching means which supply to the summing junction reference currents respectively corresponding with said breakpoints, said decision means and the first group of stages of said shift register being connected to reset the flip-flops of the first group in a pattern defining between which pair of said breakpoints the transducer output lies, and interrogating means operating in synchronism with said shift-register and connected to turn ON those switches of the first and second switching means which correspond with said pattern, said switches remaining ON during the remainder of the conversion cycle in which said decision means and the second group of shift-register stages reset flip-flops of the second group to turn ON those switches of the third switching means which provide a linearized digit count of the analog value of the measured variable.

3. An analog-to-digital converter as in claim 2 which additionally includes switching means for supplying to said junction a reference current corresponding with an alarm value of the transducer output, an additional shift-register stage, and an additional flip-flop in said feedback register, and in which a shift register stage subsequent to said added stage and said decision means normally reset said additional flip-flop but leave it to set for alarm signaling in event the transducer output represents an alarming value of the measured variable.

4. An analog-to-digital converter as in claim 2 which additionally includes switching means for supplying to said junction a reference current corresponding with an alarm value of the transducer output, an additional shift-register stage, and an additional flip-flop in said feedback register, and in which a shift-register stage subsequent to said added stage and said decision means normally set said additional flip-flop but leave it reset for alarm signaling in event the transducer output represents an alarming value of the measured variable.

5. A high-speed analog-to-digital converter of the type including a comparator amplifier having a current summing junction in its input circuit, decision means in its output circuit for response to balance of currents to said junction, and a ring-counter having counting stages which vary a reference current to said junction in digital steps characterized in that the ring-counter has additional stages in advance of said counting stages, and in that it additionally includes a first means cooperating with said additional stages and said decision means for checking the relationship between current supplied to said junction from a transducer with respect to pairs of breakpoints of the non-linear output characteristic of said transducer, a second means for supplying to said junction an offset current representative of one of the pairs of breakpoints determined by said first means as embracing the existing output of the transducer, and a third means for setting slope means in circuit between the transducer and said junction at a value corresponding with the slope of a straight-line segment between said pair of breakpoints, said offset current and slope setting remaining fixed for the subsequent analog-to-digital conversion to effect linearization thereof.

6. A high-speed analog-to-digital converter as in claim 5 including one or more additional ring-counter stages in advance of said counting stages, and means including a flip-flop set by each additional stage for temporarily supplying to said junction a reference current corresponding with an alarm value of the transducer output, a stage subsequent to said additional stage and said decision means rendering said flip-flop in one state for no signaling and another state for signaling in event the transducer output corresponds with an alarm value thereof.

7. A high-speed analog-to-digital converter of the type including a comparator amplifier having a current-summing junction in its input circuit, decision means in its output circuit for response to balance of currents to said junction, and a ring-counter having counting stages which vary a reference current to said junction in digital steps characterized in that one or more stages are included in the ring-counter in advance of its counting stages, and in that means including a flip-flop initially set by each additional stage effects supply to said junction of a reference current corresponding with an alarm value of the transducer output, and means including a ring-counter stage and said decision means rendering said flip-flop in one state for no signaling and another state for signaling in event the transducer output corresponds with an alarm value thereof.

References Cited

UNITED STATES PATENTS

| | | | |
|---|---|---|---|
| 2,547,035 | 3/1951 | McWhirter | 177—351 |
| 2,974,315 | 3/1961 | Lebel | 340—347 |
| 3,239,833 | 3/1966 | Gray | 340—347 |
| 3,253,273 | 5/1966 | Allen | 340—347 |
| 3,281,827 | 10/1966 | Olshausen | 340—347 |
| 3,281,828 | 10/1966 | Hisashi Kaneko | 340—347 |

DARYL W. COOK, *Acting Primary Examiner.*

J. H. WALLACE, *Assistant Examiner.*

UNITED STATES PATENT OFFICE

CERTIFICATE OF CORRECTION

Patent No. 3,354,452 November 21, 1967

Irving Gary Bard et al.

It is hereby certified that error appears in the above numbered patent requiring correction and that the said Letters Patent should read as corrected below.

Column 1, line 48, "values" should read -- value --. Column 4, line 53, "poins" read -- points --; line 69, "adjusting" should read -- adjustable --. Column 5, line 26, "breakpoint" should read -- breakpoints --. Column 6, line 14, after "magni-" insert -- tude of current IB to the summing point 13. --; line 67, "flip-flop" should read -- Flip-flop --; line 70, "start" should read -- Start --. Column 9, line 54, "register" should read -- resistor --; line 60, "Fig. 5)" should read -- (Fig. 5) --; lines 66 and 67, "(Fig. 3). The" should read -- (Fig. 3), the --.

Signed and sealed this 16th day of September 1969.

(SEAL)
Attest:

EDWARD M.FLETCHER,JR.
Attesting Officer

WILLIAM E. SCHUYLER, JR.
Commissioner of Patents